United States Patent Office 3,280,141
Patented Oct. 18, 1966

3,280,141
4-NITROPYRAZOLE CARBOXYLIC ACIDS-(5)
Franz Reicheneder, Ludwigshafen (Rhine), Germany, and Karl Dury, deceased, late of Kirchheimbolanden, Germany, by Johanna Maria Dury, heiress-at-law, Kirchheimbolanden, Germany, assignors to Badische Anilin- & Soda-Fabrik Aktiengesellschaft, Ludwigshafen (Rhine), Germany
No Drawing. Filed Dec. 30, 1964, Ser. No. 422,883
Claims priority, application Germany, Jan. 2, 1964, B 74,873
5 Claims. (Cl. 260—310)

This invention relates to a process for the production of 4-nitropyrazole carboxylic acids-(5) from 4-nitro-5-hydroxypyridazones-(6) and also to the substances themselves.

It is an object of this invention to provide a process for the production of 4-nitropyrazole carboxylic acids-(5) in which these substances are obtained in good yields and in a simple way. A further object of this invention is the 4-nitropyrazole carboxylic acids themselves.

We have found that 4-nitropyrazole carboxylic acids-(5) having the general formula:

$$\begin{array}{c} \text{H–C}\!=\!=\!=\!\text{C–NO}_2 \\ \| \quad\quad\quad \| \\ \text{N} \quad\quad \text{C–COOH} \\ \diagdown \!\!\diagup \\ \text{N} \\ | \\ \text{R} \end{array} \quad (I)$$

are obtained by treating 4-nitro-5-hydroxypyridazones-(6) having the general formula:

$$\begin{array}{c} \text{NO}_2 \\ | \\ \text{C} \\ \diagup \quad \diagdown \\ \text{H–C} \quad\quad \text{C–OH} \\ \| \quad\quad\quad | \\ \text{N} \quad\quad \text{C=O} \\ \diagdown \!\!\diagup \\ \text{N} \\ | \\ \text{R} \end{array} \quad (II)$$

in the presence of inert solvents at temperatures of from 10° to 130° C. with a base which imparts to the reaction mixture a pH value higher than 10 and then liberating with an acid from the resultant salts the desired 4-nitropyrazole carboxylic acids-(5).

The 4-nitro-5-hydroxypyridazones-(6) having the general Formula II are new substances. They may be prepared for example by reaction of appropriately substituted 4,5-dihalopyridazones-(6) with a nitrite, for example in the molar ratio 1:3, in the presence of water at temperatures of from about 50° to 180° C.

In the Formulas I and II the radical R may denote an aryl radical with 6 to 12 carbon atoms which bear substituents, such as one or two hydroxy groups, nitro groups, alkoxy groups having one to four carbon atoms, chlorine atoms or bromine atoms. The radical R may also be an arylsulfonyl radical whose aryl radical may contain 6 to 12 carbon atoms and may bear substituents, such as the said groups or atoms.

In the preferred initial materials of the Formula II, the radical R denotes a phenyl nucleus which bear one or two alkyl groups each having one to four carbon atoms, nitro groups, chlorine atoms or bromine atoms as substituents. The radical R may also denote the sulfonyl radical of a benzenesulfonic acid and the benzene nucleus may bear the last-mentioned substituents. For example the following 4-nitro-5-hydroxypyridazones-(6) may be reacted:

1-phenyl-4-nitro-5-hydroxypyridazone(6),
1-α-naphthyl-4-nitro-5-hydroxypyridazone-(6),
1-p-methylphenyl-4-nitro-5-hydroxypyridazone-(6),
1-[o-methyl-p-propylphenyl]-4-nitro-5-hydroxypyridazone-(6),
1-m-chlorophenyl-4-nitro-5-hydroxypypridazone-(6),
1-p-bromophenyl-4-nitro-5-hydroxypyridazone-(6),
1-[m,p-dichlorophenyl]-4-nitro-5-hydroxypyridazone-(6),
1-m-nitrophenyl-4-nitro-5-hydroxypyridazone-(6),
1-[o,p-dinitrophenyl]-4-nitro-5-hydroxypyridazone-(6),
1-[o-chloro-m-nitrophenyl]-4-nitro-5-hydroxypyridazone-(6),
1-[o-chloro-m-methylphenyl]-4-nitro-5-hydroxypyridazone-(6),
1-tosyl-4-nitro-5-hydroxypyridazone-(6),
1-o-chlorotosyl-4-nitro-5-hydroxypyridazone-(6),
1-benzenesulfonyl-4-nitro-5-hydroxypyridazone-(6), or
1-[m-nitrotosyl]-4-nitro-5-hydroxypyridazone-(6).

The 4-nitro-5-pyrazole carboxylic acids-(5) which can be prepared according to this invention may be represented by the general formula:

$$\begin{array}{c} \text{H–C}\!=\!=\!=\!\text{C–NO}_2 \\ \| \quad\quad\quad \| \\ \text{N} \quad\quad \text{C–COOH} \\ \diagdown \!\!\diagup \\ \text{N} \\ | \\ \text{R} \end{array} \quad (I)$$

in which R denotes the same substituents as in Formula II of the initial material.

The bases used may be alkaline reacting substances by means of which a pH value of more than 10 may be set up in the reaction mixture. Examples of such substances are hydroxides, oxides or alcoholates of the alkali metal and alkaline earth metals, such as sodium hydroxide, potassium hydroxide, lithium hydroxide, calcium hydroxide, barium hydroxide, sodium methylate and sodium ethylate, and also strongly basic amines or ammonium bases, such as trimethylamine, triethylamine or benzyltrimethyl ammonium hydroxide.

The bases are preferably dissolved in an inert solvent, such as water, alkanols, for example methanol, ethanol or isopropanol, and alkanediols, for example glyco, propanediols or butanediol-(1,4). Ethers, such as dioxane or tetrahydrofuran, or mixtures of the said solvents, may also be used.

The process may be carried out for example by placing the initial material in the said solvents and then adding such an amount of base that the pH value of the reaction mixture is at least 10. As a rule the pH value of the reaction mixture is from 11 to 13. The reaction may however be carried out at an even higher pH value. The amount of base used is therefore dependent on the pH value at which the reaction is to be carried out.

When the reaction is over, the reaction mixture is acidified, the pyrazole carboxylic acid thus being liberated from the salt of the pyrazole carboxylic acid formed by the reaction. The acid is precipitated and may easily be recovered, for example by filtration. All acids which are stronger than the pyrazole carboxylic acid may be used to set the 4-nitropyrazole carboxylic acid-(5) free. It is preferred to use mineral acids, such as hydrochloric acid, sulfuric acid or phosphoric acid. If an alkaline earth metal oxide or hydroxide be used as the base, it is advantageous to acidify with hydrochloric acid because when sulfuric acid is used a sparingly soluble alkaline earth metal sulfate is also precipitated. Acidification may also be carried out with a lower fatty acid, for example with formic acid or acetic acid.

Compounds obtainable according to the process are new. They are valuable intermediates for the production of dyes, pharmaceuticals and pest control agents. By dry heating of the carboxylic acids in the presence of copper powder, 4-nitropyrazoles appropriately substituted in 1-position are obtained which may be used as fungicides. These pyrazoles may also be used as agents against protozoa, similarly to the 4-nitropyrazoles described in French patent specification No. 1,275,090.

The invention is further illustrated by the following examples. The parts specified in the examples are parts by weight.

*Example 1*

12 parts of 1-phenyl-4-nitro-5- hydroxypyridazone-(6) is dissolved in 200 parts of 1.5% aqueous caustic soda solution and the solution is stirred for forty-eight hours at room temperature. A slight precipitate is filtered off and the filtrate is acidified with 5% sulfuric acid. The precipitate which forms is separated. 10.5 parts of 1-phenyl-4-nitropyrazole-5-carboxylic acid is obtained. This is recrystallized once from methanol and once from acetonitrile with an addition of a little active carbon. The 1-phenyl-4-nitropyrazole-5-carboxylic acid is obtained in the form of colourless needles having a melting point of 190° C. (with decomposition).

Analysis ($C_{10}H_7O_4N_3$) (233.18): Calculated: C, 51.51%; H, 3.03%; O, 27.45%; N, 18.02%. Found: C, 52.0%; H, 3.3%; O, 26.9%; N, 17.9%.

*Example 2*

10 parts of 1-phenyl-4-nitro-5-hydroxypyridazone-(6) is dissolved in 1000 parts of 10% aqueous caustic soda solution and stirred at 50° C. for three hours. The color of the solution deepens from deep yellow to red. Processing is carried out as described in Example 1. 8 parts of 1-phenyl-4-nitropyrazole-5-carboxylic acid (identical with that described in Example 1) is obtained.

*Example 3*

10 parts of 1-phenyl-4-nitro-5-hydroxypyridazone-(6) is dissolved in 100 parts of 2% aqueous caustic soda solution and heated at 100° C. for two minutes. The whole is cooled and processed as described in Example 1. 8.4 parts of 1-phenyl-4-nitropyrazole-5-carboxylic acid (identical with that described in Example 1) is obtained.

*Example 4*

10 parts of 1-phenyl-4-nitro-5-hydroxypyridazone-(6) is dissolved in 100 parts of 10% aqueous caustic potash solution. The solution is kept at 100° C. for ten minutes and processed analogously to Example 1. 5.7 parts of 1-phenyl-4-nitropyridazole-5-carboxylic acid (identical with that described in Example 1) is obtained.

*Example 5*

10 parts of the same pyridazone as in Example 1 is dissolved in 100 parts of 10% aqueous barium hydroxide and kept for fifteen minutes at 90° to 95° C. The solution is acidified with hydrochloric acid. 6 parts of the 1-phenyl-4-nitropyrazole-5-carboxylic acid described in Example 1 is obtained.

*Example 6*

8.5 parts of 1-phenyl-4-nitro-5-hydroxypyridazone-(6) is kept at 102° to 105° C. in 100 parts of 5% aqueous lithium hydroxide for fifteen minutes. Processing is carried out as described in Example 5. 3.6 parts of 1-phenyl-4-nitropyrazole-5-carboxylic acid is obtained.

*Example 7*

10 parts of the same pyridazone as in Example 1 is suspended in 50 parts of water. 10 parts of benzyltrimethyl ammonium hydroxide is added as a 30% solution in methanol. The solution is heated under reflux on a steam bath for one hour. The methanol is then expelled and 6 parts of 1-phenyl-4-nitropyrazole-5-carboxylic acid is isolated as described in Example 1.

*Example 8*

12.5 parts of 1-phenyl-4-nitro-5-chloropyridazone-(6) is dissolved in 100 parts of methanol and then 10 parts of potassium hydroxide is added in portions. When the reaction has subsided, the methanol solution is concentrated to half its volume, allowed to cool and poured carefully into such an amount of 10% aqueous hydrochloric acid that the mixture has an acid reaction at the end. Processing is carried out as described in Example 1. 8.5 parts of 1-phenyl-4-nitropyrazole-5-carboxylic acid (identical with that described in Example 1) is obtained.

*Example 9*

10 parts of 1-tosyl-4-nitro-5-hydroxypyridazone-(6) is introduced into 100 parts of 2 N caustic soda solution and the solution is heated on a steam bath for five minutes. The solution thus becomes deep red in color and remains clear. It is cooled and acidified. 4.5 parts of 1-tosyl-4-nitropyrazole-5-carboxylic acid is obtained. The acid is recrystallized from methanol and has a dual melting point; after the sample has partly melted at 135° to 140° C. and resolidified, it melts finally at 210° C. with decarboxylation.

Analysis ($C_{11}H_9O_6N_3S$) (311): Calculated: C, 42.45%; N, 2.92%; O, 30.9%; N, 13.5%; S, 10.25%. Found: C, 43.2%; H, 3.0%; O, 30.8%; N, 13.3%; S, 10.5%.

*Example 10*

10 parts of 1-p-tolyl-4-nitro-5-hydroxypyridazone-(6) is dissolved in 100 parts of 2 N caustic soda solution and heated for thirty minutes on a steam bath. The solution is cooled and acidified with dilute hydrochloric acid. 7 parts of 1-p-tolyl-4-nitropyrazole-5-carboxylic acid is obtained. The acid is recrystallized from benzene and white crystals are obtained having a melting point of 162° to 163° C. (with decomposition).

Analysis ($C_{11}H_9O_4N_3$) (247.21): Calculated: C, 53.44%; H, 3.67%; O, 25.89%; N, 17.00%. Found: C, 53.1%; H, 3.9%; O, 26.5%; N, 16.3%.

*Example 11*

8.5 parts of 1-m-nitrophenyl-4-nitro-5-hydroxypyridazone-(6) is reacted in the way described in Example 1, and processed in the way described in the said example. 6 parts of 1-m-nitrophenyl-4-nitropyrazole-5-carboxylic acid is obtained. After it has been recrystallized from a small amount of methanol, it melts at 151° to 152° C. (with decomposition).

Analysis ($C_{10}H_6O_6N_4$) (278.18: Calculated: C, 43.17%; H, 2.17%; O, 34.51%; N, 20.14%. Found: C, 43.3%; H, 2.7%; O, 34.5%; N, 19.7%.

*Example 12*

10 parts of 1-(3,4-dichlorophenyl)-4-nitro-5-hydroxypyridazone-(6) is reacted as described in Example 10. 6.5 parts of 1-(3,4-dichlorophenyl)-4-nitropyrazole-5-carboxylic acid is obtained. A sample which has been recrystallized from ethyl acetate melts at 148° to 150° C. (with decomposition).

Analysis ($C_{10}H_5O_4N_3Cl_2$) (302): Calculated: C, 39.7%; H, 1.655%; O, 21.2%; N, 13.9%; Cl, 23.5%. Found: C, 39.9%; H, 1.8%; O, 21.0%; N, 13.7%; Cl, 24.0%.

We claim:

1. A 4-nitropyrazole-5-carboxylic acid having the formula $$\begin{array}{c} H-C \!=\! C-NO_2 \\ \| \quad\quad \| \\ N \quad\; C-COOH \\ \diagdown \!\! \diagup \\ N \\ | \\ R \end{array}$$

wherein R denotes a member selected from the group consisting of aryl of 6 to 12 carbon atoms, arylsulfonyl of from 6 to 12 carbon atoms, and said aryl and arylsulfonyl of from 6 to 12 carbon atoms each bearing substituents selected from the group consisting of hydroxy, nitro, alkoxy of 1 to 4 carbon atoms, chlorine and bromine.
2. 1-phenyl-4-nitropyrazole-5-carboxylic acid.
3. 1-tosyl-4-nitropyrazole-5-carboxylic acid.
4. 1-p-tolyl-4-nitropyrazole-5-carboxylic acid.
5. 1-m-nitrophenyl-4-nitropyrazole - 5 - carboxylic acid.

References Cited by the Examiner

Elderfield: Heterocyclic Compounds, vol. 5, page 105, N.Y., John Wiley & Sons, 1957.

Maki et al.: Jour. Pharm. Soc. (Japan), vol. 83, pages 725–728 (1963).

WALTER A. MODANCE, *Primary Examiner.*

JOHN D. RANDOLPH, NATALIE TROUSOF,
*Assistant Examiners.*